UNITED STATES PATENT OFFICE.

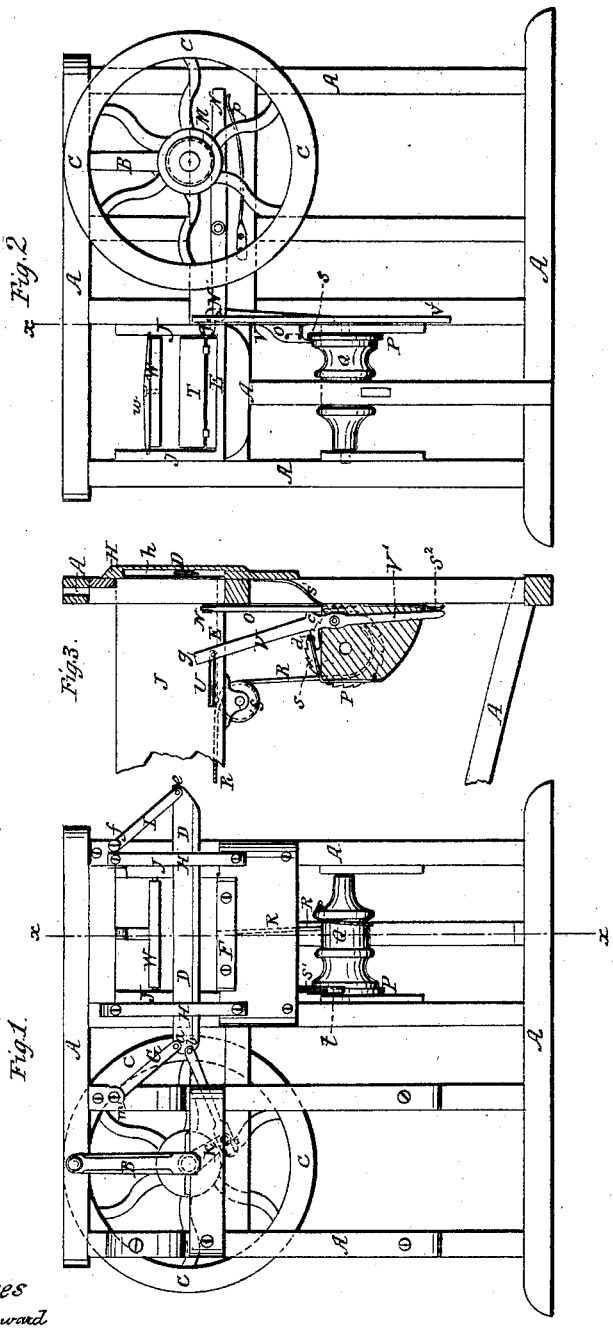

I. A. COWDERY, OF NORTH MIDDLETOWN, KENTUCKY, AND G. W. COWDERY, OF GREAT BEND, OHIO.

STRAW-CUTTER.

Specification of Letters Patent No. 30,529, dated October 30, 1860.

*To all whom it may concern:*

Be it known that we, ISAAC A. COWDERY, of North Middletown, in the county of Bourbon and State of Kentucky, and GEORGE W. COWDERY, of Great Bend, in the county of Meigs and State of Ohio, have invented certain new and useful Improvements in Straw-Cutters; and we do hereby declare the following to be a correct description of the same, reference being had to the accompanying drawings and to the letters of reference marked thereon.

Figure 1 is a front elevation of our improved straw cutter; Fig. 2, a rear elevation of the same; Fig. 3, a longitudinal vertical section through line X, X, of Fig. 1; Fig. 4, a longitudinal vertical section through line Z, Z, of Fig. 2.

The same part is marked by the same letter of reference wherever it occurs.

Our invention consists in the improvements in the construction and arrangement of the cutting and feeding apparatus of a straw cutter, hereinafter fully described and represented in the accompanying drawings.

To enable others to make and use our improved straw cutter, we will proceed to describe its construction and operation with reference to the drawings, in which A marks the frame of the machine which is usually made of wood; B, the crank or winch by which the machine is operated; C, the fly wheel; D, the knife pivoted at $a$ and to vibrating bars G and I and working in slot $h$ inside of the guides H. The bars G and I, are pivoted to the frame respectively at $m$, and $f$. The knife D, is also pivoted at $b$, to pitman L, which is driven by crank K, shown in dotted lines in Fig. 1.

F is the fixed lower jaw in conjunction with which the knife D operates.

E is the bottom of the straw box, and J its sides.

M marks an eccentric or cam, on the shaft of wheel C, which operates lever N the fulcrum of which is at $x$. The action of the cam is counteracted by the spring $p$ which impels the long arm of the lever upward. The short arm of lever N is pivoted to the upper end of fork O, the inner prong of which is a hooked pawl $t$ actuated by spring $s'$ and engaging the teeth of the ratchet wheel P. This pawl $t$ is thrown into and out of gear by the operation of the spur $c$ on bent lever V (Fig. 3) acting against the outer prong of fork O. Lever V is pivoted at its fulcrum $z$ to a bracket on the frame. Its lower arm V' is borne outward by the spring $s^2$. On its upper arm is spur $c$ which operates upon fork O as before stated, and spur $d$ which, at the same time that pawl $t$ is thrown out of engagement with wheel P, holds the spring pawl $s$ out of engagement with that wheel, and leaves the wheel free to turn in either direction. This only takes place when the upper arm V is released, and in obedience to the impulse of spring $s^2$ rises to an upright position parallel or nearly so to O. When in the position shown in Fig. 3, both the pawls $s$ and $t$ are engaged with the teeth of the ratchet wheel P. The lever V is held in this position by means of a short pin $g$, in its upper end which catches in a slot U, in the side of the straw box. This pin is thrown out by the operation of a lever working horizontally in the slot, and operated by contact with the rake box T.

The ratchet wheel P is on the inner end of a spool Q around which the cord R is wound by the operation of the ratchet wheel. This cord passes up over a pulley S, and through an aperture in the bottom of the straw box and is attached to the rake box T, as clearly shown in Fig. 4. As the ratchet wheel P turns, the spool Q winds up the cord R and the rake box T is drawn gradually toward the cutting end of the straw box. When the pawls $s$ and $t$ are disengaged from wheel P, the spool is free to rotate in the opposite direction and the rake box T may be pushed back by hand to the rear end of the straw box. When the box T is at the front end of the straw box, it strikes against the lever in slot U, and releases the upper end of lever V, which assumes an upright position, and throws the pawls $s$ and $t$ out of engagement with wheel P as before mentioned.

The box T is composed of two leaves hinged, as shown in Fig. 4, and having rake teeth $r$ for the purpose of firmly holding the straw.

Between the sides J, J, of the straw box, is introduced a cover W, nearly the whole length of the box, the office of which is to press down upon the top of the straw in the box, and keep it in a compact condition for being cut. It has pins $n$ projecting from its sides near the front end of the box which move in vertical grooves $l$ in the sides J of the box. A button $w$, on the rear end of the cover, works into horizontal grooves in the sides J. From the top of the cover rises a standard $k$ to which a lever Y is pivoted. The rear end of this is forked, and works over a perforated stanchion W', through which pins are passed to hold the lever in any desired position upon it. To the top of lever Y, is attached a spring $i$, the free end of which works against a cross piece of frame A, as seen in Fig. 4. The office of the spring and lever, is to create a graduated and yielding pressure upon the top of the straw in the box.

The operation of our straw cutter is as follows:

The rake box T being drawn back to the rear end of the straw box, the straw to be cut is placed in the box, its rear end being firmly held by the teeth $r$ between the leaves of box T. The winch B is then turned, when the feeding mechanism is operated by cam M, and the straw drawn toward the front of the box, and under the knife D, which, by the further operation descends and cuts it. When the knife D is at the lowest point the arms G and I are vertical and the knife has its greatest power. When the operation is completed the rake box T being at the front end of the box acts upon the lever in slot U and throws the feeding mechanism out of gear in the manner hereinbefore described, when the rake box T can be retracted, and the machine is ready for a second operation.

Having thus fully described our invention, what we claim, and desire to secure by Letters Patent, is—

1. The combination of the cam M, lever N, and fork O, constructed and arranged as described for the purpose set forth.

2. The combination of the lever V, with its spurs $c$ and $d$, with the fork O and spring pawl $s$, as and for the purpose set forth.

3. The combination with the top W of the lever Y and its spring $i$ arranged and operating as described.

The above specification, signed and witnessed this 13 day of August, A. D. 1860.

I. A. COWDERY.
     G. W. COWDERY.

Witnesses:
 W. L. WINTER,
 R. WINTER.